United States Patent [19]

Kusche

[11] 4,381,644

[45] May 3, 1983

[54] EXHAUST SYSTEM FOR THREE CYLINDER TWO-CYCLE ENGINES

[75] Inventor: David W. Kusche, Oshkosh, Wis.

[73] Assignee: Brunswick Corporation, Skokie, Ill.

[21] Appl. No.: 211,380

[22] Filed: Nov. 28, 1980

[51] Int. Cl.³ .............................................. F02B 27/02
[52] U.S. Cl. ...................................... 60/313; 60/314; 60/323
[58] Field of Search .................. 60/312, 313, 314, 323

[56] References Cited

U.S. PATENT DOCUMENTS

| | | | |
|---|---|---|---|
| 3,494,334 | 2/1970 | Johnson | 60/313 |
| 3,543,509 | 12/1970 | Boerma | 60/314 |
| 3,692,006 | 9/1972 | Miller | 60/314 |
| 3,695,238 | 10/1972 | Boerma | 60/313 |
| 3,772,887 | 11/1973 | Ziegler | 60/313 |
| 3,898,803 | 8/1975 | Sasaki | 60/323 |
| 4,086,763 | 5/1978 | Matsushita | 60/323 |
| 4,187,809 | 2/1980 | Lanpheer | 60/313 |

*Primary Examiner*—Douglas Hart
*Attorney, Agent, or Firm*—O. T. Sessions

[57] ABSTRACT

A three cylinder, two-cycle engine 10 has a tuned exhaust system formed in a die-cast cylinder block 14. The exhaust manifold is formed by a cavity on the exhaust side of the cylinder block 14 with an exhaust gas outlet passageway 30 formed in the head end of the block 14.

7 Claims, 10 Drawing Figures

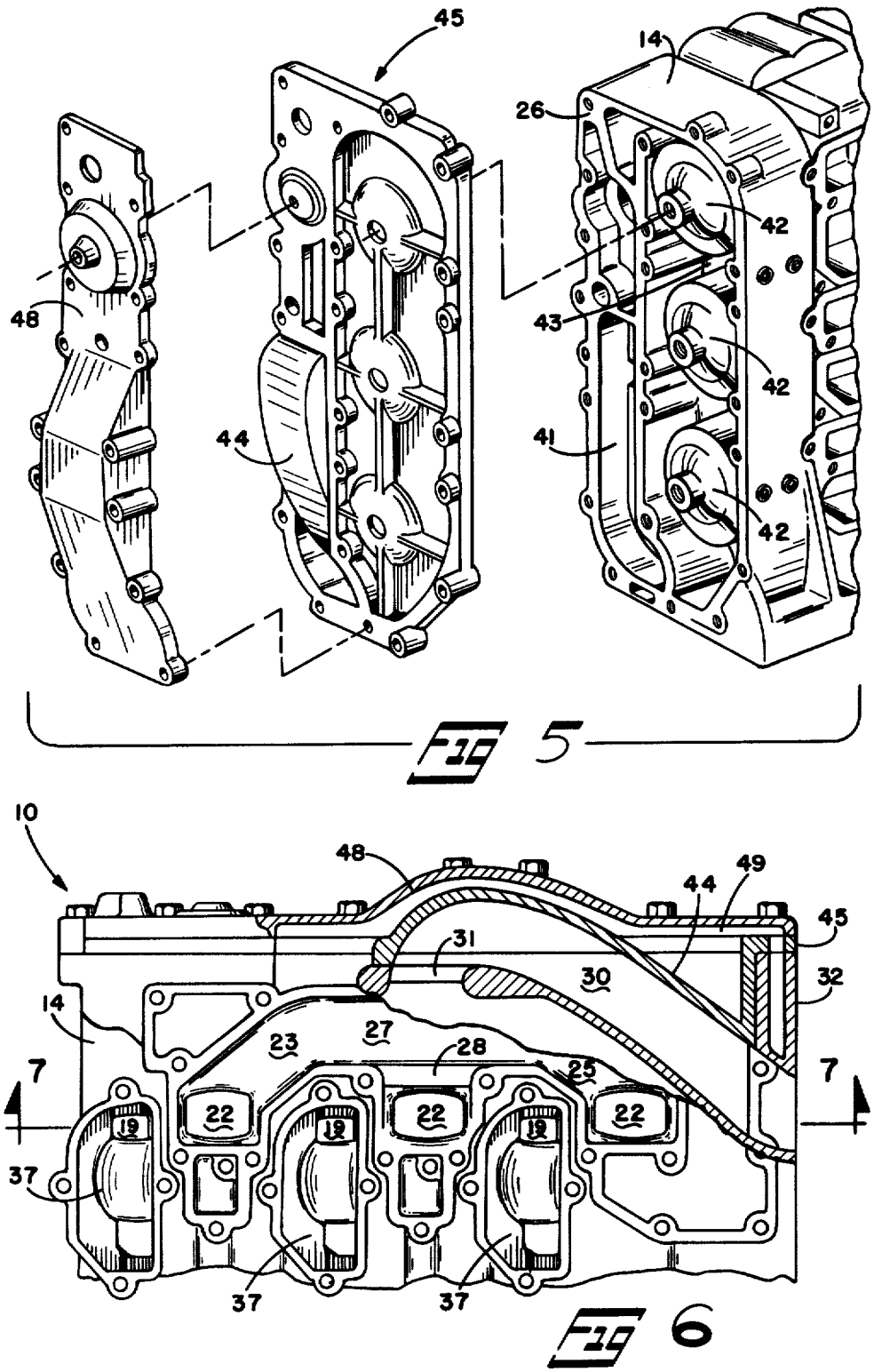

4,381,644

EXHAUST SYSTEM FOR THREE CYLINDER TWO-CYCLE ENGINES

DESCRIPTION

This invention relates to internal combustion engines and particularly to exhaust systems for two-cycle engines.

BACKGROUND ART

Exhaust systems for three cylinder, two-cycle engines which utilize positive pressure pulses from adjacent cylinders to pulse charge the cylinder and returning negative pressure pulses to improve scavenging have been disclosed in U.S. Pat. No. 3,692,006 and in Mellde et al, *Some Experiences of Two-Cycle Engines as Power Unit for a Passenger Car*, 65008 (954A), SAE Transactions, 1966.

Another type of exhaust system for a three cylinder engine is disclosed in U.S. Pat. No. 3,772,887. This system provides equal acoustical lengths between each of the cylinder exhaust ports and a common exhaust passage but does not attempt to provide equal lengths between the exhaust ports.

An exhaust system for a V-6 engine is disclosed in U.S. Pat. No. 4,187,809. Each bank of three cylinders is provided with an exhaust manifold having channels between the exhaust ports to provide a shortened transmission path for exhaust pulses.

DISCLOSURE OF INVENTION

A two-cycle, in-line engine has a cylinder block with three cylinders arranged in a vertical bank. Three vertically spaced exhaust ports communicate with the cylinders and an exhaust cavity in the block communicates with the exhaust ports. The exhaust cavity is open on the exhaust face of the block and has a vertically extending trunk with a centrally located manifold opening through the head face of the block. An exhaust manifold cover is attached to the exhaust face of the cylinder block to form, with the exhaust cavity, an exhaust manifold. The exhaust manifold has substantially equal length acoustical paths between the manifold opening in the head face of the block and each of the exhaust ports and, further, has substantially equal acoustical distances between each of the exhaust ports.

The engine may be loop charged with transfer passages located adjacent the exhaust ports on the same side of the block.

An exhaust outlet passageway connected to the manifold opening may be provided on the head end of the cylinder block, with the passageway formed by a cavity in the head face of the block and an exhaust passageway cover attached to the block.

The exhaust cavity can have three legs perpendicular to the exhaust face of the cylinder block with each of the legs communicating respectively with one of the exhaust ports and the manifold trunk. The manifold trunk can be advantageously positioned between the exhaust ports and the head face of the block.

BRIEF DESCRIPTION OF THE DRAWINGS

FIG. 5 is an exploded perspective view illustrating the head end of the cylinder block and the associated exhaust cover and water jacket cover.

FIG. 6 is a partial sectional view of the engine of FIG. 1 showing the exhaust passage.

BEST MODE FOR CARRYING OUT THE INVENTION

Figure 1:
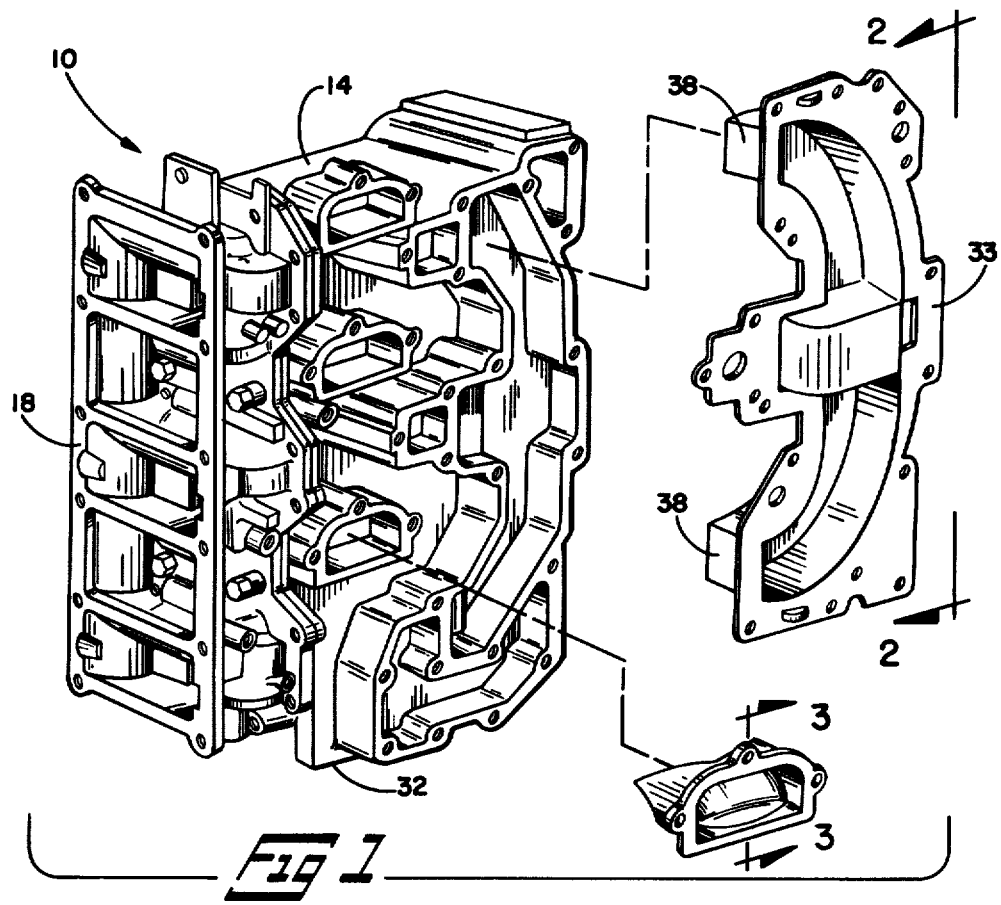
FIG. 1 is an exploded perspective view showing the crankcase end and exhaust side of the engine according to the present invention.
Figure 2:
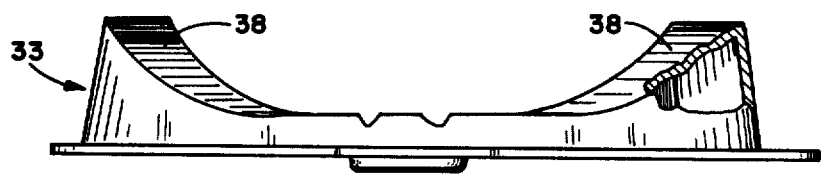
FIG. 2 is a side view of the exhaust cover shown in FIG. 1.
Figure 3:
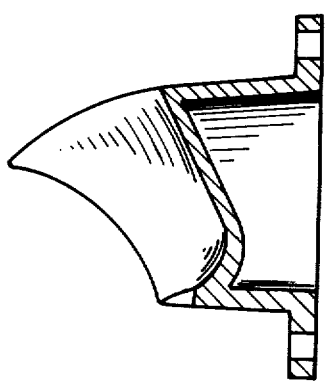
FIGS. 3 and 4 are views of the exhaust side transfer passage covers shown in FIG. 1.
Figure 4:
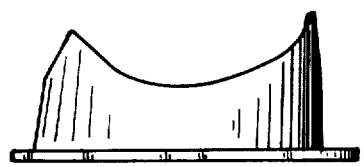
Figure 7:
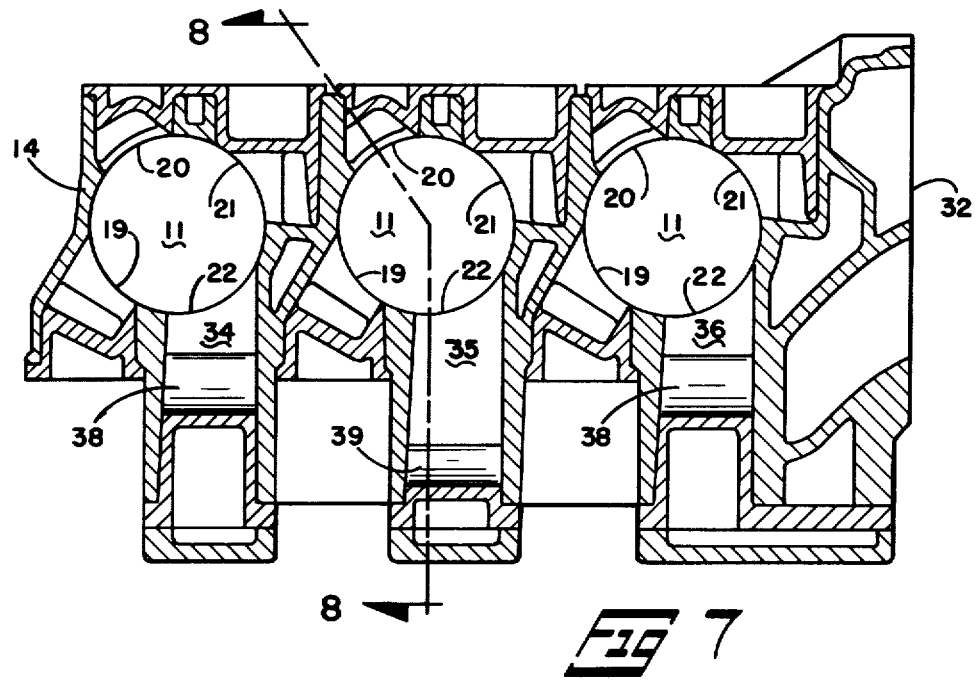
FIG. 7 is a sectional view taken along line 7—7 of FIG. 6.

Referring to the drawings, a two-cycle, three cylinder, in-line engine 10 for incorporation in an outboard motor is illustrated. The engine 10 is of the crankcase compression type and has three horizontal cylinders 11 with the axes of the cylinders lying in a vertical plane. A vertical crankshaft 12 with three crank pins 13 angularly spaced at 120° intervals is rotatably mounted at the front of the cylinder block 14. The piston 15 reciprocally mounted in each cylinder 11 is connected to the respective crank pins 13 by a connecting rod 16 to drive the crankshaft 12.

A closed crankcase compartment 17 for each cylinder 11 is defined by the crankcase end of the cylinder block 14, the intake manifold casting 18, and the crankshaft 12. The air-fuel charge is transferred from the crankcase compartments 17 to the cylinders 11 by a loop charging system, more fully disclosed in the co-pending application of Hale, entitled, "Internal Combustion Engine With Die-Castable Loop Transfer System", Ser. No. 211,436, filed on the same day as the application, and assigned to the same assignee, now U.S. Pat. No. 4,328,770. The charging system has three piston controlled transfer ports 19, 20, and 21 for each cylinder, with the transfer ports arranged to provide a loop charging flow when the transfer ports are uncovered by the piston 15.

A tuned exhaust system is provided on the exhaust side of the engine block 14 to receive the exhaust from the piston controlled exhaust ports 22 of each cylinder 11 and assist in scavenging the combustion gases from the cylinders 11. In general the exhaust system includes three branches 23, 24 and 25 of substantially equal acoustical length extending from the three cylinders 11 in a direction perpendicular to the plane of the cylinders 11. The top and bottom branches 23 and 25 then turn toward each other at the head end 26 of the block 14 and meet in vertical alignment, forming a vertically extending trunk 27. The center branch 24 is separated from the vertical branches 23 and 25 by a partition wall 28 and turns back toward the head end of the block to join the other branches on the outer side 29 of the trunk 27.

An exhaust gas outlet passageway 30 connects with a port 31 at the head end of the manifold, turns downward, and exits at the base 32 of the block 14.

Figure 8:
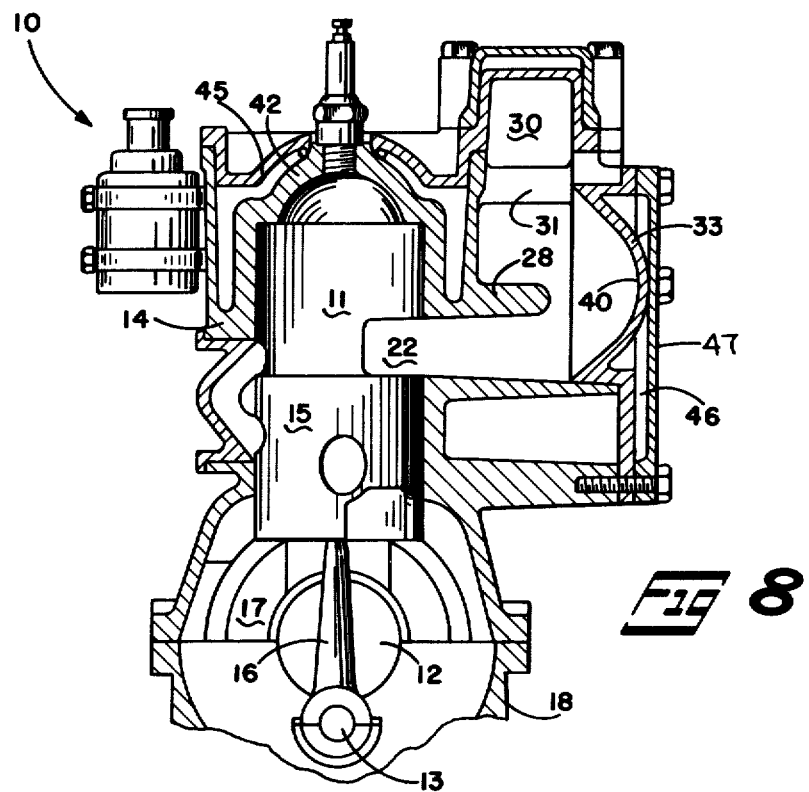
FIG. 8 is a sectional view taken along line 8—8 of FIG. 7.

The internal surfaces of the exhaust manifold are formed partially by the cavities diecast in the block and partially by an exhaust manifold cover 33 which bolts to the block 14. The three legs 34, 35, and 36 of the exhaust manifold extending perpendicular to the plane of the cylinders 11, the surface of the vertical trunk adjacent the cylinders, and the walls of the manifold perpendicular to the plane of the cylinders are shaped by the exhaust side forming die, as are the transfer passage cavities 37, as shown in FIGS. 1, 6, 7, and 8. The outside surfaces of the manifold are defined by the diecast manifold cover 33, as shown in FIGS. 1 and 8, which includes portions 38 extending in toward the top and bottom exhaust ports to turn the exhaust flow from those ports along the side of the cylinder block 14. At the center of the manifold cover, a portion 39 of the cover extends in toward the center exhaust port to turn the exhaust flow toward the head end 26 of the block 14 and a recessed portion 40 extends out past the outer surface of the top and bottom branches to provide the necessary additional length to the center branch 24, as shown in FIG. 8. The manifold passages thus defined have an essentially constant cross-sectional area.

Figure 9:
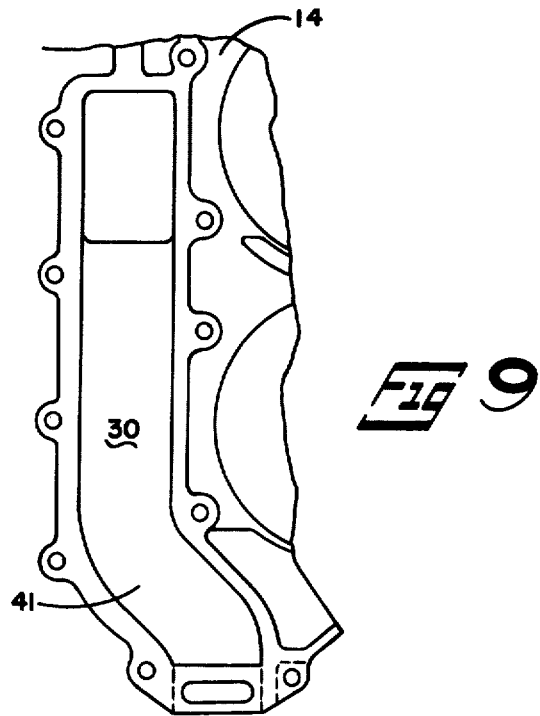
FIG. 9 is a partial view in elevation of the head end of the cylinder block.
Figure 10:
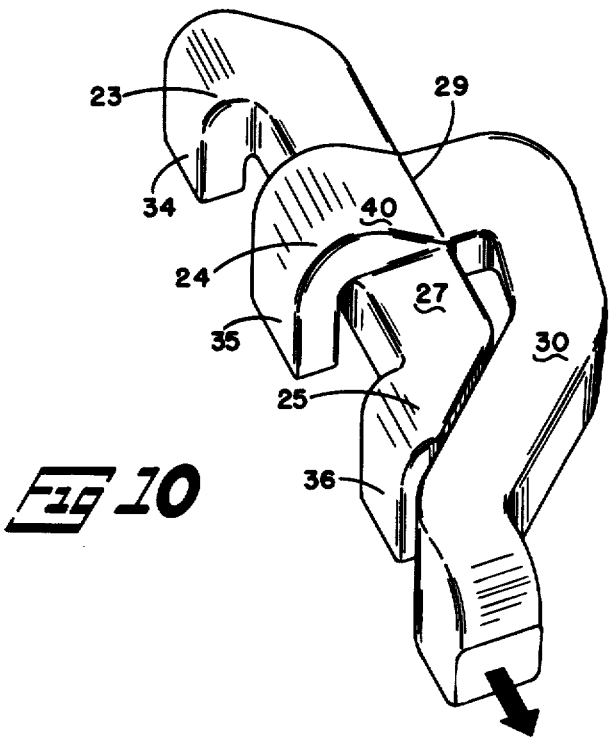
FIG. 10 is a perspective view showing the internal flow passages in the exhaust system.

At the head end of the block 14, as most clearly shown in FIGS. 6 and 9, a recess 41 is provided to form the outlet passageway. The bottom and sides of the outlet passageway are shaped by the head forming die, which also forms the exterior of the cylinder heads 42 and a water jacket 43 surrounding the cylinders 11. The exhaust outlet 30 is completed by a curved portion 44 of the cylinder water jacket cover 45 which projects into the recess to define the outlet passageway 30. As most clearly shown in FIG. 10, the exhaust outlet passageway 30 extends outwardly from the head end of the manifold, turns downward along the manifold, turns in under the manifold, and turns downward under the engine. The exhaust is then discharged out the base 32 of the block 14 into the substantially larger drive shaft housing, not illustrated, on which the engine 10 is supported. Because the exhaust outlet 30 extends from the middle of the manifold downwardly, there is no need for an exhaust tube extending below the block into the drive shaft, since the proper tuned length exhaust outlet is provided in the block.

The exhaust system is water cooled, with water jackets provided on the outer sides of both the exhaust manifold and the exhaust outlet. The exhaust manifold water jacket 46 is formed by a manifold water jacket cover 47 which is attached to the exhaust manifold cover 33 by the same bolts which attached the exhaust cover 33 to the block 14. On the head end of the block an exhaust outlet water jacket cover 48 is attached to the cylinder water jacket cover 45 to define a water jacket 49 on the outer side of the exhaust outlet passageway 30.

Because the exhaust system provides substantially equal length acoustical paths between the exhaust ports and the exhaust outlet at the base of the block, each exhaust pulse from an exhaust port will cause a rarefaction pulse to be returned to the same exhaust port. When the engine is operating at higher speeds this rarefaction wave will assist in scavenging the cylinder from which the wave originated. Furthermore, the exhaust system has substantially equal acoustical distance between each of the exhaust ports 22 to provide a pulse supercharging effect between the cylinders 11. An exhaust pressure pulse from the cylinder 11 whose exhaust port 22 has just opened will be transmitted to the exhaust port 22 just previously opened. At the design speed, this pressure pulse will arrive just after the rarefaction wave previously discussed. This pressure pulse will provide increased cylinder pressure just before the exhaust port 22 closes to create the supercharging effect.

The engine of the present invention thus provides a tuned exhaust system which may readily be die-cast and which is compatible with a die-cast loop charging system.

I claim:

1. A two-cycle, in-line engine comprising:
   (A) a die cast cylinder block having three horizontal cylinders arranged in a vertical bank, a head face at one end of said cylinders, an exhaust face on one side of said cylinders, a bottom face below said cylinders, three vertically spaced exhaust ports in communication with said cylinders on said one side of said cylinders, and an exhaust cavity in communication with said exhaust ports and having a vertically extending trunk open on said exhaust face of said block and having a centrally located manifold opening through said head face of said block; and
   (B) a die cast exhaust manifold cover attached directly to the exhaust face of said block to form with said exhaust cavity an exhaust manifold, said exhaust manifold having substantially equal length acoustical paths between said opening and each of said exhaust ports and substantially equal acoustical distance between any two of the exhaust ports.

2. A three-cylinder, in-line, two-cycle loop charged engine comprising:
   (A) a die cast cylinder block having three horizontal cylinders arranged in a vertical bank, a head face at one end of said cylinders, an exhaust face on one side of said cylinders, and a bottom face below said cylinders, said cylinder block further including:
      (1) three vertically spaced transfer passages in communication with said cylinder on the same side of said bank as said exhaust face,
      (2) three vertically spaced exhaust ports in communication with said cylinders on said exhaust face of said block with said exhaust ports located adjacent the ends of said transfer passages nearest to said head face, and
      (3) an exhaust cavity in communication with said exhaust ports, said cavity having a vertically extending trunk open on said exhaust face of said block and a centrally located manifold opening through said head face of said block, and
   (B) a die cast exhaust manifold cover attached directly to said block on said exhaust face to form with said exhaust cavity an exhaust manifold having substantially equal length acoustical paths between said opening and each of said exhaust ports and substantially equal acoustical distance between any two of said exhaust ports.

3. The engine defined in claim 1 or 2 wherein said cylinder block further includes an exhaust outlet recess open on the head face of said block, said recess in communication with said manifold opening and having an outlet through the bottom face of said block, said engine further comprising:
   (C) an exhaust passageway cover attached to said head face of said block to provide an exhaust passageway between said opening and said outlet.

4. The engine defined in claim 1 wherein said exhaust cavity includes three legs perpendicular to the exhaust face of said block, each of said legs communicating respectively with one of said exhaust ports and said trunk.

5. The engine defined in claim 4 wherein said trunk is positioned between said exhaust ports and said head face of said block.

6. The engine defined in claim 5 wherein the top and bottom legs are connected to said trunk on the side of said trunk opposite said head face.

7. The engine defined in claim 6 wherein the central one of said legs is connected to said trunk on the side of said trunk formed by said exhaust manifold cover.

* * * * *